United States Patent
Ullah et al.

(10) Patent No.: US 11,346,962 B2
(45) Date of Patent: May 31, 2022

(54) RADIATION DETECTOR FOR DETECTING RADIATION AND IDENTIFYING TYPE THEREOF

(71) Applicant: Korea University Research and Business Foundation, Seoul (KR)

(72) Inventors: Muhammad Nasir Ullah, Gumi-si (KR); Chansun Park, Goyang-si (KR); Jinho Park, Seoul (KR); Kisung Lee, Yongin-si (KR); Jeng-Yeol Yeom, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/764,533

(22) PCT Filed: Nov. 13, 2018

(86) PCT No.: PCT/KR2018/013764
§ 371 (c)(1),
(2) Date: May 15, 2020

(87) PCT Pub. No.: WO2019/098629
PCT Pub. Date: May 23, 2019

(65) Prior Publication Data
US 2020/0333478 A1    Oct. 22, 2020

(30) Foreign Application Priority Data

Nov. 17, 2017   (KR) .................. 10-2017-0153901
Nov. 13, 2018   (KR) .................. 10-2018-0138606

(51) Int. Cl.
*G01T 1/20*    (2006.01)

(52) U.S. Cl.
CPC .......... *G01T 1/2008* (2013.01); *G01T 1/2002* (2013.01); *G01T 1/2006* (2013.01)

(58) Field of Classification Search
CPC .... G01T 1/2008; G01T 1/2002; G01T 1/2006
See application file for complete search history.

(56) References Cited

U.S. PATENT DOCUMENTS

| 7,102,135 B2 | 9/2006 | Lecoq |
| 2003/0012331 A1 | 1/2003 | Kojima et al. |

(Continued)

FOREIGN PATENT DOCUMENTS

| JP | 2003-090882 A | 3/2003 |
| JP | 2015-504521 A | 2/2015 |

(Continued)

OTHER PUBLICATIONS

International Search Report dated Feb. 11, 2019 in corresponding International Patent Application No. PCT/KR2018/013764 (3 pages in English, 3 pages in Korean).

*Primary Examiner* — Hugh Maupin
(74) *Attorney, Agent, or Firm* — NSIP Law

(57) ABSTRACT

A radiation detector for detecting radiation and identifying the type thereof includes: a scintillator module formed by stacking a first scintillator emitting light in a first wavelength range by reacting with first radiation and a second scintillator emitting light in a second wavelength range by reacting with second radiation; a first optical filter attached to a region of the scintillator module and transmitting the light in the first wavelength range; a second optical filter attached to another region of the scintillator module and transmitting the light in the second wavelength range; a first photodetector sensing the light in the first wavelength range that has passed through the first optical filter; a second photodetector sensing the light in the second wavelength range that has passed through the second optical filter; and a controller determining radiation on the basis of sensing results by the first photodetector and the second photodetector.

12 Claims, 8 Drawing Sheets

(56) References Cited

U.S. PATENT DOCUMENTS

| | | | |
|---|---|---|---|
| 2004/0129886 A1 | 7/2004 | Lecoq | |
| 2009/0039271 A1* | 2/2009 | Farsoni | G01T 1/2008 250/367 |
| 2014/0306116 A1 | 10/2014 | Roessl et al. | |
| 2014/0312236 A1* | 10/2014 | Kondrasovs | G01T 1/2008 250/362 |
| 2018/0172852 A1* | 6/2018 | Newman | G01T 1/2008 |

FOREIGN PATENT DOCUMENTS

| | | |
|---|---|---|
| KR | 10-2004-0022437 A | 3/2004 |
| KR | 10-2005-0097294 A | 10/2005 |
| KR | 10-2011-0123324 A | 11/2011 |
| WO | WO 2013/116241 A1 | 8/2013 |

* cited by examiner

[FIG. 1]
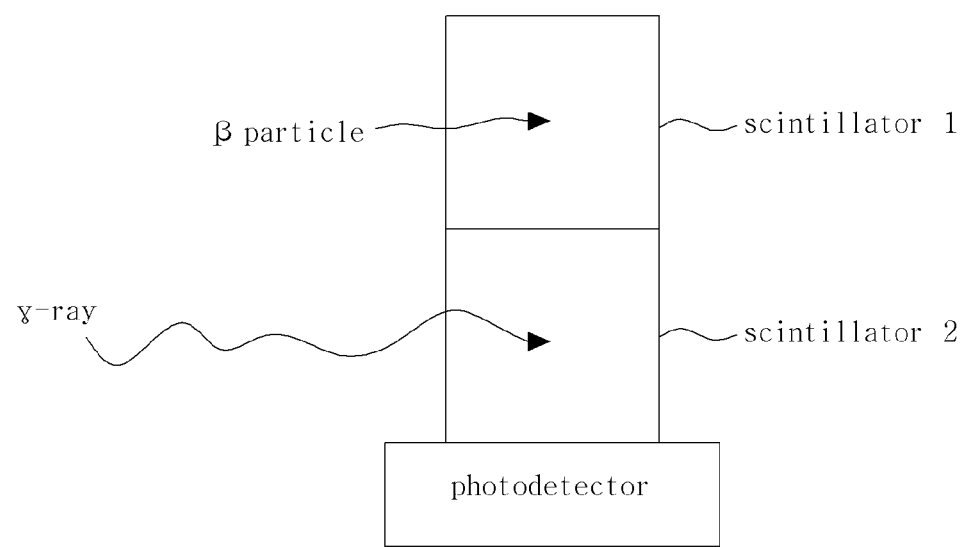

[FIG. 2]
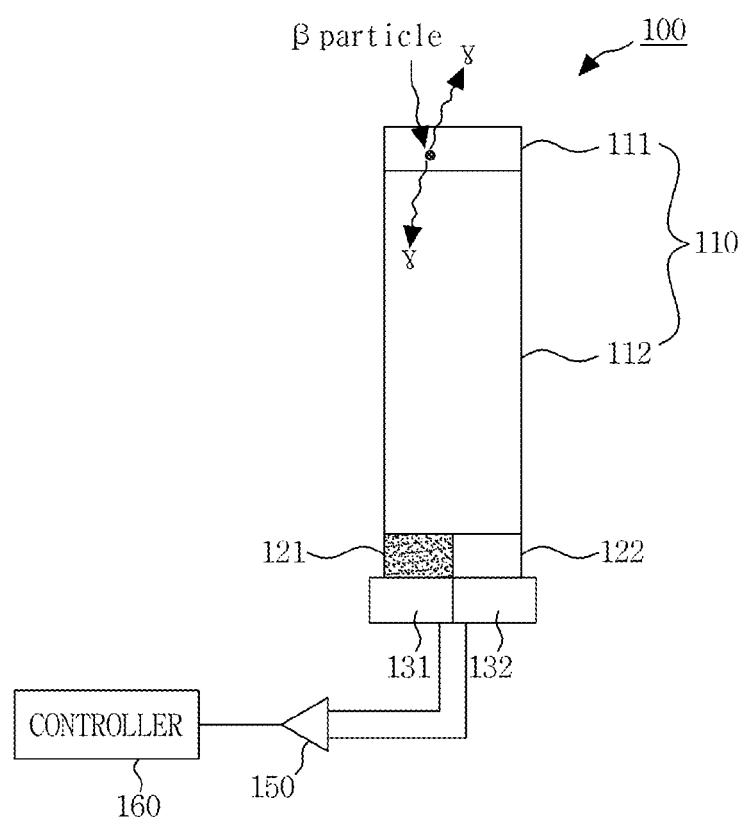

[FIG. 3]
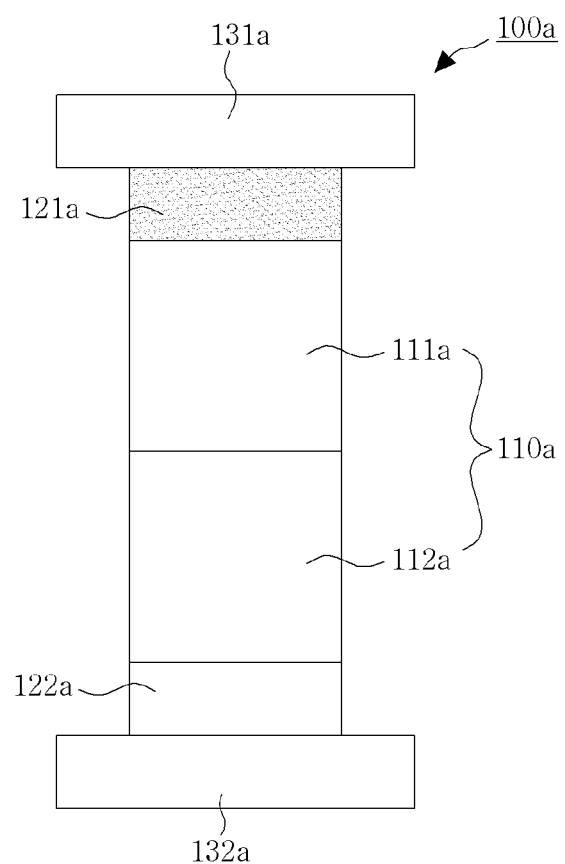

[FIG. 4]
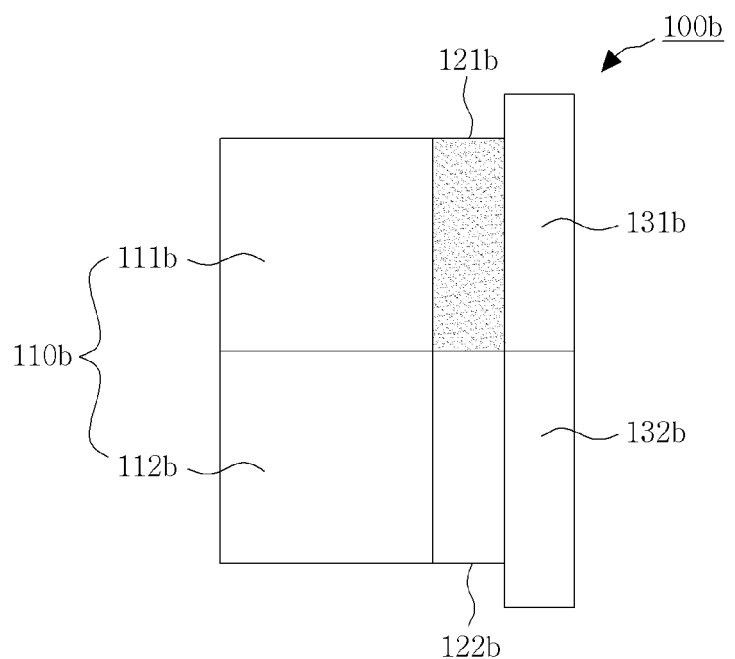

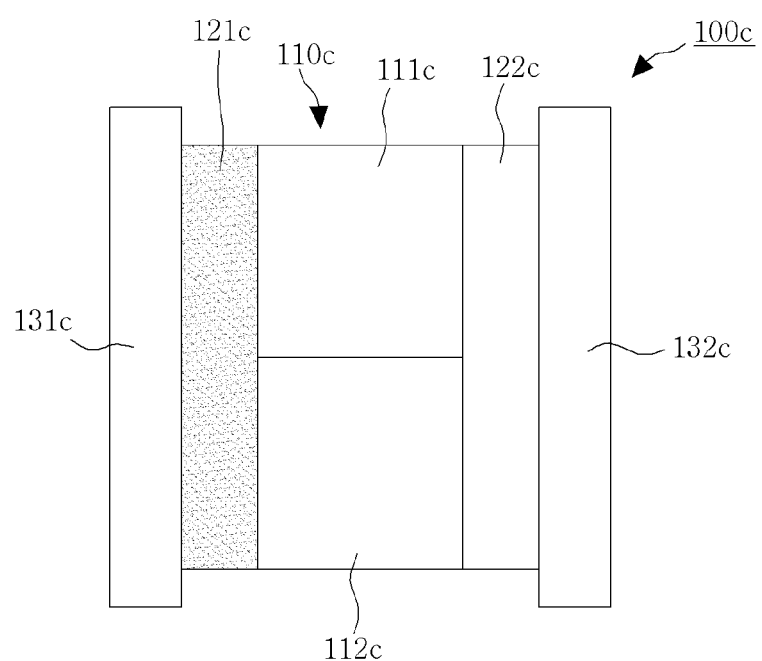
[FIG. 5]

[FIG. 6]
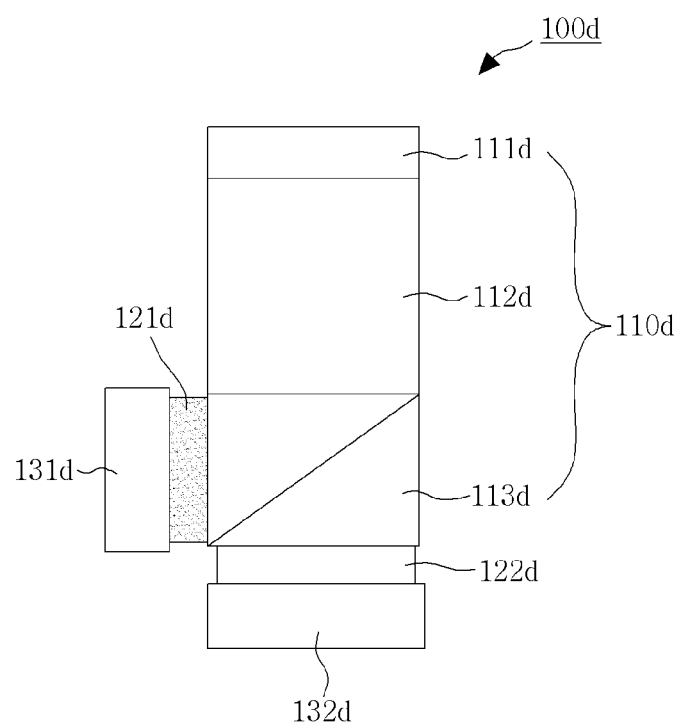

[FIG. 7]
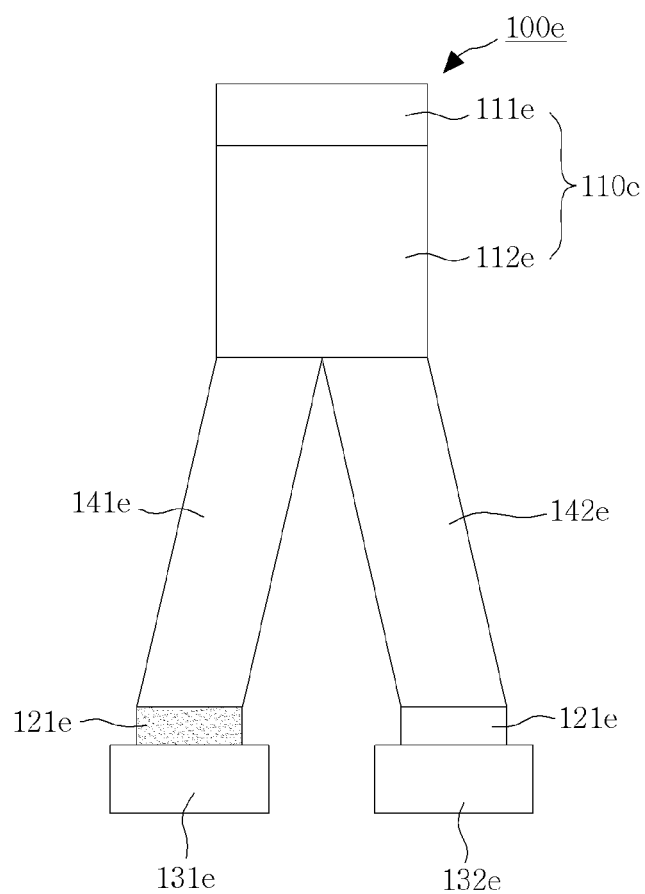

[FIG. 8]
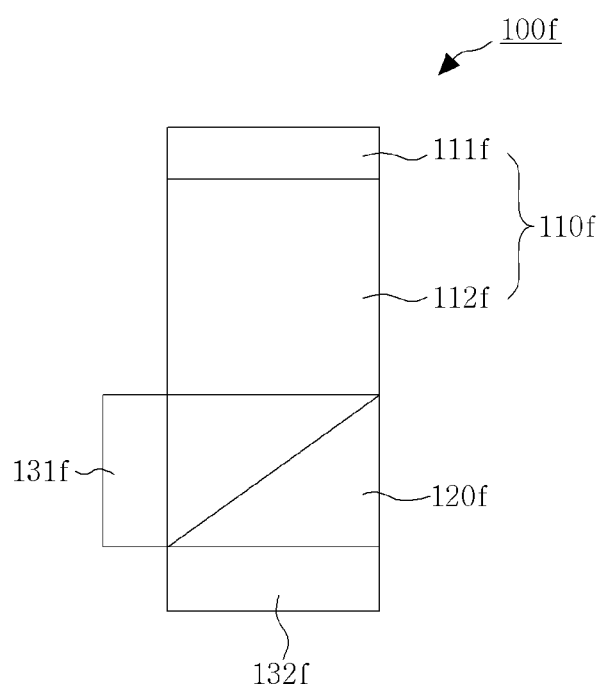

RADIATION DETECTOR FOR DETECTING RADIATION AND IDENTIFYING TYPE THEREOF

CROSS REFERENCE TO RELATED APPLICATIONS

This application is a U.S. National Stage Application of International Application No. PCT/KR2018/013764, filed on Nov. 13, 2018, which claims the benefit under 35 USC 119(a) and 365(b) of Korean Patent Application Nos. 10-2017-0153901, filed on Nov. 17, 2017, and 10-2018-0138606, filed on Nov. 13, 2018, in the Korean Intellectual Property Office, the entire disclosure of which is incorporated herein by reference for all purposes.

TECHNICAL FIELD

The present invention relates to a radiation detector that detects radiation and identifies the type of the radiation and, more particularly, to a radiation detector that can detect radiation and identify the type of the radiation and can remarkably reduce a manufacturing cost and a signal processing speed when diagnosing diseases and detecting radiation due to a radiation accident, etc.

BACKGROUND ART

In general, a Phoswich detector (also called a 'sandwich detect') is a detector developed to detect low-level and low-energy gamma rays and X-rays in addition to alpha particles and beta particles under a high-energy radiation environment. Such Phoswich detector can simultaneously identify and process different types of incident radiation of all energy levels in accordance with structural shapes.

The name 'Phoswich' is a term derived from Phosphor sandwich and means a structure in which two or more scintillators having different waveforms are optically connected to each other and coupled to an optical sensor such as a photodiode, an Avalanche Photodiode (APD), a Silicon Photomultiplier (SiPM), and a Photomultiplier Tube (PMT). It is possible to identify incident radiation nature by applying a technique such as waveform analysis to a signal generated by the reaction with a specific scintillator.

The Phoswich detector, as shown in FIG. 1, includes two or more scintillators arranged ahead and beyond or stacked on each other and identifies different types of radiation based on the transmittancy of the scintillators, whether there is reaction with the type of the scintillators. For example, a scintillator 1 is designed to detect a beta particle and a scintillator 2 is designed to detect a gamma particle. This manner is frequently used to identify the type of radiation.

In general, the Phoswich detector measures radiation using scintillators having different decay times. That is, Pulse Shape Discrimination (PSD) is required to specify a scintillator that radiation reacts with.

Figure Of Merit (FOM) and a particle reaction ratio are used to evaluate the performance of PSD. To this end, a high-speed Analog-to-Digital Converter (ADC), a complicated algorithm for Pulse Shape Discrimination (PSD) is required, which causes problems with the signal processing speed of a circuit and a computer and the cost. That is, light that is collected to a photodetector comes simultaneously from the scintillator 1 and the scintillator 2, so there is a problem that it takes a lot of cost and time to configure a circuit and process signals for identifying the type of the radiation type.

Further, if accuracy of an algorithm is not secured when discriminating radiation by processing a signal, there is a problem that detection accuracy cannot be secured and an algorithm becomes more complicated to secure the detection accuracy.

DISCLOSURE

Technical Problem

The present invention has been made in an effort to solve the problems and an objective of the present invention is to provide a radiation detector that can detect radiation and identify the type of the radiation at the detector level, can remarkably reduce a manufacturing cost and enhance a signal processing speed when diagnosing diseases and detecting radiation due to a radiation accident, etc., and can improve detection accuracy.

Technical Solution

The objectives, in accordance with the present invention, is achieved by a radiation detector for detecting radiation and identifying the type thereof includes: a scintillator module formed by stacking a first scintillator emitting light in a first wavelength range by reacting with first radiation and a second scintillator emitting light in a second wavelength range by reacting with second radiation; a first optical filter attached to a region of the scintillator module and transmitting the light in the first wavelength range; a second optical filter attached to another region of the scintillator module and transmitting the light in the second wavelength range; a first photodetector sensing the light in the first wavelength range that has passed through the first optical filter; a second photodetector sensing the light in the second wavelength range that has passed through the second optical filter; and a controller determining radiation on the basis of sensing results by the first photodetector and the second photodetector.

A thickness of the first scintillator may be smaller than a thickness of the second scintillator; the first scintillator may be configured to react with a beta ray and the second scintillator may be configured to react with a gamma ray; a beta ray traveling into the first scintillator may emit a gamma ray by reacting with the first scintillator and the gamma ray emitted by reaction with the first scintillator may react with the second scintillator; and the controller may determine a beta ray when both of the first photodetector and the second photodetector sense light.

The first scintillator may include any one of short-wavelength scintillators such as $CaF_2(CaF_2:Eu)$, CsI, LYSO, NaI, $LaBr_3$, $BaF_2$, GPS, and a plastic scintillator, and the first optical filter may be configured to transmit light in a wavelength range of 380 nm~450 nm; and the second scintillator may include any one of long-wavelength scintillators including Ce:LuAG, Ce:GAGG, and Ce:GFAG, and the second optical filter may be configured to transmit light in a wavelength range of 480 nm~700 nm.

A thickness of the first scintillator may be smaller than a thickness of the second scintillator; the first scintillator may be configured to react with a neutron and the second scintillator may be configured to react with a gamma ray; a neutron traveling into the first scintillator may emit a gamma ray by reacting with the first scintillator and the gamma ray emitted by reaction with the first scintillator may react with the second scintillator; and the controller may determine a neutron when both of the first photodetector and the second photodetector sense light.

The first scintillator may include a Boron-10-based scintillator and the first optical filter may be configured to transmit light in a wavelength range of 380 nm~450 nm; and the second scintillator may include any one of long-wavelength scintillators including Ce:LuAG, Ce:GAGG, and Ce:GFAG and the second optical filter may be configured to transmit light in a wavelength range of 480 nm~700 nm.

The first optical filter and the second optical filter may be attached to a side of the second scintillator that is opposite to the first scintillator.

The first optical filter may be attached to a side of the first scintillator that is opposite to the second scintillator; and the second optical filter may be attached to a side of the second scintillator that is opposite to the first scintillator.

The first optical filter may be attached to a side of the first scintillator in a stacking direction of the first scintillator and the second scintillator; and the second optical filter may be attached to a side of the second scintillator in the stacking direction of the first scintillator and the second scintillator.

The scintillator may further include a beam splitter attached to a side of the second scintillator that is opposite to the first scintillator and reflecting and transmitting the light in the first wavelength range and the light in the second wavelength range; and the first optical filter may be disposed in any one of reflection and transmission directions of the beam splitter and the second optical filter may be disposed in the other one of the reflection and transmission directions of the beam splitter.

The objectives may be achieved by a radiation detector for detecting radiation and identifying the type thereof, the radiation detector including: a scintillator module formed by stacking a first scintillator emitting light in a first wavelength range by reacting with first radiation and a second scintillator emitting light in a second wavelength range by reacting with second radiation; a dichroic filter attached to a side of the second scintillator that is opposite to the first scintillator, reflecting or transmitting the light in the first wavelength range, and reflecting or transmitting the light in the second wavelength range; a first photodetector sensing the light in the first wavelength range that has passed through the dichroic filter; a second photodetector sensing the light in the second wavelength range that has passed through the dichroic filter; and a controller determining radiation on the basis of sensing results by the first photodetector and the second photodetector.

A thickness of the first scintillator may be smaller than a thickness of the second scintillator; the first scintillator may be configured to react with a beta ray and the second scintillator is configured to react with a gamma ray; and detection of a beta ray may be recognized when a beta ray traveling into the first scintillator emits a gamma ray by reacting with the first scintillator, the gamma ray emitted by reaction with the first scintillator reacts with the second scintillator, and accordingly both of the first photodetector and the second photodetector sense light.

The first scintillator may include any one of short-wavelength scintillators including $CaF_2(CaF_2:Eu)$, CsI, LYSO, NaI, $LaBr_3$, $BaF_2$, GPS, and a plastic scintillator; and the second scintillator may include any one of long-wavelength scintillators including Ce:LuAG, Ce:GAGG, and Ce:GFAG.

A thickness of the first scintillator may be smaller than a thickness of the second scintillator; the first scintillator may be configured to react with a neutron and the second scintillator is configured to react with a gamma ray; and detection of a neutron may be recognized when a neutron traveling into the first scintillator emits a gamma ray by reacting with the first scintillator, the gamma ray emitted by reaction with the first scintillator reacts with the second scintillator, and accordingly both of the first photodetector and the second photodetector sense light.

The first scintillator may include a Boron-10-based scintillator and the first wavelength range may be 380 nm~450 nm; and the second scintillator may include any one of long-wavelength scintillators including Ce:LuAG, Ce:GAGG, and Ce:GFAG and the second wavelength range may be 480 nm~700 nm.

Advantageous Effects

According to this configuration, since the radiation detector uses the first optical filter and the second optical filter that selectively transmits only light in different wavelength ranges, it is possible to remarkably simplify a circuit configuration and a signal processing process and more accurately determine the kind of radiation.

Further, whether there is a beta ray is sensed on the basis of that both of the first photodetector and the second photodetector sense light when a beta ray is extracted from a gamma ray environment, so it is possible to more accurately detect a beta ray, and accordingly, the radiation detector can be used as a beta probe in surgical operations.

Further, it is possible to configure and use a neutron detector, which is not influenced by a gamma ray background using the principle described above, for national security.

DESCRIPTION OF DRAWINGS

FIG. 1 is a view showing the structure of a common Phoswich detector; and

FIGS. 2 to 8 are views showing radiation detectors according to embodiments of the present invention.

BEST MODE

The present invention relates to a radiation detector for detecting radiation and identifying the type thereof, the radiation detector includes: a scintillator module formed by stacking a first scintillator emitting light in a first wavelength range by reacting with first radiation and a second scintillator emitting light in a second wavelength range by reacting with second radiation; a first optical filter attached to a region of the scintillator module and transmitting the light in the first wavelength range; a second optical filter attached to another region of the scintillator module and transmitting the light in the second wavelength range; a first photodetector sensing the light in the first wavelength range that has passed through the first optical filter; a second photodetector sensing the light in the second wavelength range that has passed through the second optical filter; and a controller determining radiation on the basis of sensing results by the first photodetector and the second photodetector.

MODE FOR INVENTION

Hereafter, a radiation detector 100 according to the present invention is described in detail with reference to the embodiments shown in the figures.

FIG. 2 is a view showing a radiation detector 100 according to an embodiment of the present invention. Referring to FIG. 1, a radiation detector 100 according to an embodiment of the present invention includes a scintillator module 110, a first optical filter 121, a second optical filter 122, a first photodetector 131, a second photodetector 132, and a controller 160.

The scintillator module 110 includes a first scintillator 111 and a second scintillator 112. It is exemplified in FIG. 2 that the first scintillator 111 and the second scintillator 112 are stacked. The first scintillator 111 is provided to reaction with first radiation and emits light in a first wavelength range by reacting with the first radiation.

The second scintillator 112 emits light in a second wavelength range by reacting with second radiation. The first radiation and the second radiation are different types of radiation, and the first wavelength range and the second wavelength range are different wavelength ranges without an overlapping period.

The first optical filter 121 is attached to a region of the scintillator module 110 and transmits only the light in the first wavelength range. The second optical filter 122 is attached to another region of the scintillator module 110 and transmits only the light in the second wavelength range. Accordingly, the light in the first wavelength range emitted by the first radiation traveling into the first scintillator 111 and then reacting passes through the first optical filter 121, but is blocked without passing through the second optical filter 122. Similarly, the light in the second wavelength range emitted by the first radiation traveling into the second scintillator 112 and then reacting passes through the second optical filter 122, but is blocked without passing through the first optical filter 121.

The first photodetector 131 is installed to sense the light in the first wavelength range that has passed through the first optical filter 121 and the second photodetector 122 is installed to sense the light in the second wavelength range that has passed through the second optical filter 122. It is exemplified in FIG. 2 that the first photodetector 131 is disposed behind the first optical filter 121 and the second photodetector 132 is disposed behind the second optical filter 122.

According to this configuration, the controller 160 determines radiation on the basis of the sensing results by the first photodetector 131 and the second photodetector 132. For example, when radiation is sensed by only the first photodetector 131, the controller 160 recognizes that radiation that reacts with the first scintillator 111 corresponding to the first photodetector 131 has been detected. On the contrary, when radiation is sensed by only the first photodetector 131, the controller 160 recognizes that radiation that reacts with the second scintillator 112 corresponding to the second photodetector 132 has been detected. Further, when radiation is sensed by both of the first photodetector 131 and the second photodetector 132, the controller 160 determines that two types of radiation have been detected.

According to this configuration, it is possible to identify and determine the types of radiation on the basis of that radiation has been detected by which one of the first photodetector 131 and the second photodetector 132 even without configuring a complicated circuit or processing a signal.

Hereafter, a method of determining a beta ray using the configuration is described in detail with reference to FIG. 2. As described above, when a beta ray (or a 'beta particle, the same hereafter) is detected by an existing Phoswich detector, it is difficult to secure accuracy of measurement due to a surrounding gamma ray environment or a gamma ray generated after reaction of the beta ray, and it is required to configure a complicated circuit or process a signal in order to determine whether there is a beta ray in an environment in which both of a beta ray and a gamma ray exist, which was described above.

In an embodiment of the present invention, it is exemplified that, in order to determine a beta ray, the first scintillator 111 is a substance that reacts with a beta ray, for example, any one of short-wavelength scintillators including $CaF_2$ ($CaF_2$:Eu), CsI, LYSO, NaI, $LaBr_3$, $BaF_2$, GPS, and a plastic scintillator and the second scintillator 112 is any one of long-wavelength scintillators including Ce:LuAG, Ce:GAGG, and Ce:GFAG that react with a gamma ray.

Further, it is exemplified that the first optical filter 121 is configured to transmit light in a wavelength range of 380 nm~450 nm in consideration of the wavelength range of light that is emitted by reaction of a beta ray with the first scintillator 111, and the second optical filter is configured to transmit light in a wavelength range of 480 nm~700 nm in consideration of the wavelength range of light that is emitted by reaction of a gamma ray with the second scintillator 112. The transmissive wavelength ranges of the first optical filter 121 and the second optical filter 122 may depend on the substances of the first scintillator 111 and the second scintillator 112.

In this process, assuming that only a beta ray exists, when the beta ray travels into the first scintillator 111, as shown in FIG. 1, the beta ray reacts with the first scintillator 111, whereby light in the first wavelength range is emitted and gamma rays are emitted respectively in two side directions. The gamma rays emitted by reaction with the first scintillator 111 travel into the second scintillator 112 and then react, thereby emitting light in the second wavelength range.

The light in the first wavelength range emitted from the first scintillator 111 passes through the first optical filter 121 and is then sensed by the first photodetector 131, and the light in the second wavelength range emitted from the second scintillator 112 passes through the second optical filter 122 and is then sensed by the second photodetector 132. The controller 160 determines that light has been detected by both of the first photodetector 131 and the second photodetector 132, so the controller 160 determines that a beta ray exists.

If light is detected by only the second photodetector 132 due to common surrounding gamma rays or light is not detected even by the second photodetector 132 in an environment without a beta ray, the controller 160 can determine that a beta ray has not been detected. The controller 160, as shown in FIG. 2, can determine the type of radiation even on the basis of only a simple output signal from a comparator 150 or through conventional readout method.

As another example, a method of detecting a neutron using the radiation detector 100 according to the present invention is described.

In general, neutron detection is used in a nondestructive test, a nuclear energy site, a security screener, or the like, and recently, is widely used for sensing nuclear bombs in relation with terrors. Since not only neutrons, but also gamma rays are emitted in a nuclear energy site or from a nuclear bomb, additional signal processing such as waveform analysis described above is performed to detect only neutrons, so there is a problem that detection takes a long time.

It is exemplified in the present invention that the first scintillator 111 is configured to react with a neutron and the second scintillator 112 is configured to react with a gamma ray. For example, the first scintillator 111 is a boron scintillator such as Boron-10 and the second scintillator 112 is any one of long-wavelength scintillator including Ce:LuAG, Ce:GAGG, and Ce:GFAG.

Further, it is exemplified that the first optical filter 121 is configured to transmit light in a wavelength range of 380 nm~450 nm in consideration of the wavelength range of light that is emitted by reaction of a boron scintillator and a neutron, and as described above, the second optical filter 122 is configure to transmit light in a wavelength range of 480 nm~700 nm.

A neutron reacts with Boron-10 as follows.

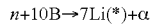

An alpha ray generated in the boron scintillator is caught in the boron scintillator, but a gamma ray is caught in the boron scintillator or goes out of the boron scintillator. When Boron-10 is used in an existing radiation detector 100, there is a problem that when neutrons are detected, the detection efficiency is remarkably reduced due to influence by gamma rays.

However, according to the radiation detector 100 of the present invention, when a neutron reacts with the first scintillator 111 that is a boron scintillator and a gamma ray is emitted, the emitted gamma ray travels into the second scintillator 112 and reacts with the second scintillator 112.

The light in the first wavelength range that is emitted by reaction in the first scintillator 111 passes through the first optical filter 121 and is then detected by the first photodetector 131 and the light in the second wavelength range that is emitted by reaction in the second scintillator 112 passes through the second optical filter 122 and is then detected by the second photodetector 132. Accordingly, the controller 160 can determine a neutron on the basis of that light is sensed by the first photodetector 131 and the second photodetector 132.

In this case, it is exemplified in the present invention that the thickness of the first scintillator 111 is smaller than the thickness of the second scintillator 112 in the embodiment for detecting a beta ray or a neutron described above. For example, it is exemplified that the thickness of the boron scintillator is about 0.5 mm~1 mm and the thickness of the second scintillator 112 is about 10 mm. Accordingly, a gamma ray emitted by reaction in the first scintillator 111 is made travel directly into the adjacent second scintillator 112, it is possible to increase the detection efficiency and accuracy in the process of recognizing that a beta ray or a neutron exists when light is sensed by both of the first photodetector 131 and the second photodetector 132.

Hereafter, a radiation detector 100 according to another embodiment of the present invention is described with reference to FIGS. 3 to 8.

In a radiation detector 100 according to the embodiment shown in FIG. 2, it is exemplified that the first optical filter 121 and the second optical filter 122 are attached to the side of the second scintillator 112 that is opposite to the first scintillator 111. However, in a radiation detector 100a according to the embodiment shown in FIG. 3, it is exemplified that a first optical filter 121a is attached to the side of a first scintillator 111a that is opposite to a second scintillator 112a and a second optical filter 122a is attached to the side of the second scintillator 112a that is opposite to the first scintillator 111a. Further, it is exemplified that a first photodetector 131a is disposed behind the first optical filter 121a and a second photodetector 132a is disposed behind the second optical filter 122a, whereby the second photodetector 132a, the second optical filter 122a, the second scintillator 112a, the first scintillator 111a, the first optical filter 121a, and the first photodetector 131a are sequentially stacked from the bottom in FIG. 3.

In the embodiment shown in FIG. 4, it is exemplified that a first optical filter 121b and a second optical filter 122b of a radiation detector 100b are attached to a side in the stacking direction of each of a first scintillator 111b and a second scintillator 112b. It is exemplified in FIG. 4 that the first optical filter 121b is attached to the first scintillator 111b on a side in the stacking direction and the second optical filter 122b is attached to the second scintillator 112b on the side in the stacking direction. Further, it is exemplified that a first photodetector 131b and a second photodetector 132b are disposed respectively on a side of each of the first optical filter 121b and the second optical filter 122b.

In the embodiment shown in FIG. 5, it is exemplified that a first optical filter 121c and a second optical filter 122c of a radiation detector 100c are attached to both sides in the stacking direction of each of a first scintillator 111c and a second scintillator 112c. Further, it is exemplified that the first optical filter 121c is disposed on a side of each of the first scintillator 111c and the second scintillator 112c to prevent light emitted from the second scintillator 112c from traveling to a first photodetector 131c, and similarly, the second optical filter 122c is attached to another side of each of the first scintillator 111c and the second scintillator 112c to prevent light emitted from the first scintillator 111c from traveling to a second photodetector 132c.

In the embodiment shown in FIG. 6, it is exemplified that a scintillator module 110d of a radiation detector 100d includes a beam splitter 113d. The beam splitter 113d is attached to the side of a first scintillator 111d that is opposite to a second scintillator 112d, and transmits and reflects light.

Further, a first optical filter 121d is disposed in any one of reflection and transmission directions of the beam splitter 113d and a second optical filter 122d is disposed in the other one of the reflection and transmission directions of the beam splitter 113d. Accordingly, in light in a first wavelength range and light in a second wavelength range that travel to the first optical filter 121d, only the light in the first wavelength range is transmitted and sensed by a first photodetector 131d. Further, in the light in the first wavelength range and the light in the second wavelength range that travel to the second optical filter 122d, only the light in the second wavelength range is transmitted and sensed by a second photodetector 132d.

In the embodiment shown in FIG. 7, it is exemplified that there is provided light guides 141e and 142e such as optical fibers that guide light in a first wavelength range and light in a second wavelength range, which are emitted from a first scintillator 111e and a second scintillator 112e, to a first optical filter 121e and a second optical filter 122e. The light that is guided by the optical guides 141e and 142e includes the first wavelength range and the second wavelength range, respectively, and selectively travels into the first photodetector 131e and the second photodetector 132e through the first optical filter 121e and the second optical filter 122e.

In a radiator detector 100f according to the embodiment shown in FIG. 8, it is exemplified that a dichroic filter 120f replaces the first optical filter 121 and a second optical filter 122 in the embodiment shown in FIG. 2. The dichroic filter 120f is attached to the side of a second scintillator 112f that is opposite to a first scintillator 111f. The dichroic filter 120f reflects (or transmits) light in a first wavelength range toward a first photodetector 131f and transmits (or reflects) light in a second wavelength range toward a second photodetector 132f.

In the radiation detector 100f according to the embodiment shown in FIG. 8, light in different wavelength ranges separately travels due to the dichroic filter 120f, whereby it is possible to achieve the same effect as those in the embodiments described above.

The radiation detectors 100, 100a, 100b, 100c, 100d, 100e, and 100f described above and shown in the figures are only an embodiment for achieving the present invention and should not be construed as limiting the spirit of the present invention. The protective range of the present invention is determined only by those described in claims and embodiments changed and modified without departing from the spirit of the present invention should be construed as being included in the protective range of the present invention that is apparent to those skilled in the art.

DESCRIPTION OF THE REFERENCE NUMERALS IN THE DRAWINGS 100, 100a, 100b, 100c, 100d, 100e, 100f: radiation detector
110, 110a, 110b, 110c, 110d, 110e, 110f: scintillator module
111, 111a, 111b, 111c, 111d, 111e, 111f: first scintillator
112, 112a, 112b, 112c, 112d, 112e, 112f: second scintillator
113d: beam splitter
120f: dichroic filter
121, 121a, 121b, 121c, 121d, 121e: first optical filter
122, 122a, 122b, 122c, 122d, 122e: second optical filter
131, 131a, 131b, 131c, 131d, 131e, 131f: first photodetector
132, 132a, 132b, 132c, 132d, 132e, 132f: second photodetector
141e, 142e: light guide
150: comparator 160: controller

INDUSTRIAL APPLICABILITY

The present invention can be used to diagnose diseases and detect radiation due to radiation accidents for example by detecting not only alpha particles and beta particles, but also low-level and low-energy gamma rays and X-rays.

The invention claimed is:

1. A radiation detector for detecting and identifying a type of a radiation, the radiation detector comprises:
a scintillator module comprising a stack of a first scintillator emitting a first light in a first wavelength range by reacting with a first radiation of the radiation and a second scintillator emitting a second light in a second wavelength range by reacting with a second radiation of the radiation;
a first optical filter attached to a first region of the scintillator module and transmitting the first light in the first wavelength range;
a second optical filter attached to a second region of the scintillator module and transmitting the second light in the second wavelength range;
a first photodetector sensing the first light passing through the first optical filter;
a second photodetector sensing the second light passing through the second optical filter; and
a controller detecting and determining the type of the radiation based on sensing results from the first photodetector and the second photodetector,
wherein a thickness of the first scintillator is smaller than a thickness of the second scintillator,
wherein the first scintillator is configured to react with a beta ray and the second scintillator is configured to react with a gamma ray,
wherein the first scintillator emits the first light and the gamma ray by reacting with the beta ray,
wherein the second scintillator emits the second light by reacting with the gamma ray emitted from the first scintillator, and
wherein the controller determines as the radiation comprises the beta ray when both of the first photodetector and the second photodetector sense light.

2. The radiation detector of claim 1,
wherein the first scintillator comprises any one of short-wavelength scintillators comprising $CaF_2(CaF_2:Eu)$, CsI, LYSO, NaI, $LaBr_3$, $BaF_2$, GPS, and a plastic scintillator and the first optical filter is configured to transmit the first light in a wavelength range of 380 nm~450 nm; and
wherein the second scintillator comprises any one of long-wavelength scintillators comprising Ce:LuAG, Ce:GAGG, and Ce:GFAG and the second optical filter is configured to transmit the second light in a wavelength range of 480 nm~700 nm.

3. The radiation detector of claim 1, wherein the first optical filter and the second optical filter are attached to a side of the second scintillator that is opposite to the first scintillator.

4. The radiation detector of claim 1,
wherein the first optical filter is attached to a side of the first scintillator that is opposite to the second scintillator, and
wherein the second optical filter is attached to a side of the second scintillator that is opposite to the first scintillator.

5. The radiation detector of claim 1,
wherein the first optical filter is attached to a side of the first scintillator in a stacking direction of the first scintillator and the second scintillator, and
wherein the second optical filter is attached to a side of the second scintillator in the stacking direction of the first scintillator and the second scintillator.

6. The radiation detector of claim 1,
wherein the scintillator further comprises a beam splitter attached to a side of the second scintillator that is opposite to the first scintillator,
wherein the beam splitter reflects and transmits the first light and the second light, and
wherein the first optical filter is disposed in any one of reflection and transmission directions of the beam splitter and the second optical filter is disposed in the other one of the reflection and transmission directions of the beam splitter.

7. A radiation detector for detecting and identifying a type of a radiation, the radiation detector comprises:
a scintillator module comprising a stack of a first scintillator emitting a first light in a first wavelength range by reacting with a first radiation of the radiation and a second scintillator emitting a second light in a second wavelength range by reacting with a second radiation of the radiation;
a first optical filter attached to a first region of the scintillator module and transmitting the first light in the first wavelength range;
a second optical filter attached to a second region of the scintillator module and transmitting the second light in the second wavelength range;
a first photodetector sensing the first light passing through the first optical filter;
a second photodetector sensing the second light passing through the second optical filter; and a controller detecting and determining the type of the radiation based on sensing results from the first photodetector and the second photodetector, wherein a thickness of the first scintillator is smaller than a thickness of the second scintillator, wherein the first scintillator is configured to react with a neutron and the second scintillator is configured to react with a gamma ray, wherein the first scintillator emits the first light and the gamma ray by reacting with the neutron, wherein the second scintillator emits the second light by reacting with the gamma ray from the first scintillator, and wherein the controller determines as the radiation comprises the neutron when both of the first photodetector and the second photodetector sense light.

8. The radiation detector of claim 7, wherein the first scintillator comprises a Boron-10-based scintillator and the first optical filter is configured to transmit the first light in a wavelength range of 380 nm~450 nm; and wherein the second scintillator comprises any one of long-wavelength scintillators comprising Ce:LuAG, Ce:GAGG, and Ce:GFAG and the second optical filter is configured to transmit the second light in a wavelength range of 480 nm~700 nm.

9. A radiation detector for detecting and identifying a type of a radiation, the radiation detector comprises:

a scintillator module comprising a stack of a first scintillator emitting a first light in a first wavelength range by reacting with a first radiation of the radiation and a second scintillator emitting a second light in a second wavelength range by reacting with a second radiation of the radiation;

a dichroic filter attached to a side of the second scintillator that is opposite to the first scintillator, reflecting or transmitting the first light in any one of reflection and transmission directions, and reflecting or transmitting the second light in the other one of the reflection and transmission directions;

a first photodetector sensing the first light from the dichroic filter;

a second photodetector sensing the second light from the dichroic filter; and a controller detecting and determining the type of the radiation based on sensing results from the first photodetector and the second photodetector, wherein a thickness of the first scintillator is smaller than a thickness of the second scintillator, wherein the first scintillator is configured to react with a beta ray and the second scintillator is configured to react with a gamma ray, and wherein the beta ray is detected when the first scintillator reacted with the beta ray emits the gamma ray, the gamma emitted from the first scintillator reacts with the second scintillator, and accordingly both of the first photodetector and the second photodetector sense light.

10. The radiation detector of claim 9, wherein the first scintillator comprises any one of short-wavelength scintillators comprising $CaF_2(CaF_2:Eu)$, CsI, LYSO, NaI, $LaBr_3$, $BaF_2$, GPS, and a plastic scintillator, and wherein the second scintillator comprises any one of long-wavelength scintillators comprising Ce:LuAG, Ce:GAGG, and Ce:GFAG.

11. A radiation detector for detecting and identifying a type of a radiation, the radiation detector comprises:

a scintillator module comprising a stack of a first scintillator emitting a first light in a first wavelength range by reacting with a first radiation of the radiation and a second scintillator emitting a second light in a second wavelength range by reacting with a second radiation of the radiation;

a dichroic filter attached to a side of the second scintillator that is opposite to the first scintillator, reflecting or transmitting the first light in any one of reflection and transmission directions, and reflecting or transmitting the second light in the other one of the reflection and transmission directions;

a first photodetector sensing the first light from the dichroic filter;

a second photodetector sensing the second light from the dichroic filter; and a controller detecting and determining the type of the radiation based on sensing results from the first photodetector and the second photodetector, wherein a thickness of the first scintillator is smaller than a thickness of the second scintillator, wherein the first scintillator is configured to react with a neutron and the second scintillator is configured to react with a gamma ray, and wherein the neutron is detected when the first scintillator reacted with the neutron emits the gamma ray, the gamma ray emitted from the first scintillator reacts with the second scintillator, and accordingly both of the first photodetector and the second photodetector sense light.

12. The radiation detector of claim 11, wherein the first scintillator comprises a Boron-10-based scintillator and the first wavelength range is 380 nm~450 nm, and wherein the second scintillator comprises any one of Ce:LuAG, Ce:GAGG, and Ce:GFAG and the second wavelength range is 480 nm~700 nm.

* * * * *